United States Patent
Henry et al.

(10) Patent No.: US 12,507,297 B2
(45) Date of Patent: Dec. 23, 2025

(54) STABLE BALANCING OF MULTI-LINK OPERATION (MLO) USAGE IN CROWDED SPACE

(71) Applicant: Cisco Technology, Inc., San Jose, CA (US)

(72) Inventors: Jerome Henry, Pittsboro, NC (US); Pascal Thubert, Roquefort-les-Pins (FR); Amine Choukir, Lausanne (CH); Domenico Ficara, Essertines-sur-Yverdon (CH); Vishal Satyendra Desai, San Jose, CA (US)

(73) Assignee: Cisco Technology, Inc.

( * ) Notice: Subject to any disclaimer, the term of this patent is extended or adjusted under 35 U.S.C. 154(b) by 466 days.

(21) Appl. No.: 18/046,610

(22) Filed: Oct. 14, 2022

(65) Prior Publication Data

US 2024/0129976 A1    Apr. 18, 2024

(51) Int. Cl.
*H04W 76/15* (2018.01)
*H04W 28/26* (2009.01)

(52) U.S. Cl.
CPC ........... *H04W 76/15* (2018.02); *H04W 28/26* (2013.01)

(58) Field of Classification Search
CPC ..... H04W 76/15; H04W 28/26; H04W 48/20; H04W 84/12
See application file for complete search history.

(56) References Cited

U.S. PATENT DOCUMENTS

| | | |
|---|---|---|
| 10,383,039 B2 | 8/2019 | Henry et al. |
| 2008/0146230 A1 | 6/2008 | Pandian et al. |

(Continued)

FOREIGN PATENT DOCUMENTS

| | | |
|---|---|---|
| WO | 2021251757 A1 | 12/2021 |
| WO | 2022214168 A1 | 10/2022 |

OTHER PUBLICATIONS

IEEE: "Draft Standard for Information technology—Telecommunications and Information Exchange between Systems Local and Metropolitan Area Networks—Specific requirements, Part 11: Wireless LAN Medium Access Control (MAC) and Physical Layer (PHY) Specifications Amendment 8: Enhancements for Extre", IEEE Draft, Draft P802.11BE_D2.1.1, IEEE-SA, Piscataway, NJ USA, 802.11be drafts, D2.1.1, Aug. 14, 2022, pp. 1-871, XP068192258, https://grouper.ieee.org/groups/802/11/private/Draft_Standards/11be/Draft_802.11be_D2.1.1.pdf.

(Continued)

*Primary Examiner* — Sun Jong Kim
(74) *Attorney, Agent, or Firm* — Merchant & Gould P.C.

(57) ABSTRACT

Balancing Multi-link Operation (MLO) usage may be provided. A list of a plurality of Access Points (APs) for each of a plurality of Multi-link Operation (MLO) types indicating availability of each of the plurality of APs may be received. A first request indicating an MLO type associated with the first request is a first MLO type may be received. In response to the first request, a first subset of the list of the plurality of APs that support the MLO type associated with the first request may be sent. A second request indicating that an MLO type associated with the second request is the first MLO type may be received. In response to the second request, a second subset of the list of the plurality of APs that support the MLO type associated with the second request may be sent. The first subset is different from the second subset.

20 Claims, 6 Drawing Sheets

(56) References Cited

U.S. PATENT DOCUMENTS

| | | | |
|---|---|---|---|
| 2014/0307708 A1* | 10/2014 | Son ................... | H04W 36/144 |
| | | | 370/331 |
| 2015/0173047 A1 | 6/2015 | Yamada | |
| 2016/0029304 A1* | 1/2016 | Sim ..................... | H04W 48/16 |
| | | | 455/525 |
| 2020/0221285 A1* | 7/2020 | Graul ................ | H04W 36/0094 |
| 2021/0212045 A1 | 7/2021 | Cherian et al. | |
| 2021/0400662 A1 | 12/2021 | Huang et al. | |
| 2022/0022033 A1 | 1/2022 | Ho et al. | |
| 2022/0225200 A1 | 7/2022 | Smith et al. | |

OTHER PUBLICATIONS

International Search Report and Written Opinion for International Application No. PCT/US2023/076449, dated Feb. 5, 2024, 20 pages.
Park M., et al., "CC36 Comment Resolution for EMLSR—Part 1", IEEE 802.11-21/283R1, Aug. 19, 2021, 10 Pages, XP093055456, see proposed changes to 35.3.16.

* cited by examiner

STABLE BALANCING OF MULTI-LINK OPERATION (MLO) USAGE IN CROWDED SPACE

TECHNICAL FIELD

The present disclosure relates generally to stable balancing of Multi-link Operation (MLO) usage in crowded space.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Balancing Multi-link Operation (MLO) usage may be provided. A list of a plurality of Access Points (APs) for each of a plurality of Multi-link Operation (MLO) types indicating availability of each of the plurality of APs may be received. A first request indicating an MLO type associated with the first request is a first MLO type may be received. In response to the first request, a first subset of the list of the plurality of APs that support the MLO type associated with the first request may be sent. A second request indicating that an MLO type associated with the second request is the first MLO type may be received. In response to the second request, a second subset of the list of the plurality of APs that support the MLO type associated with the second request may be sent. The first subset is different from the second subset.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wi-Fi 7 Multi-link Operation (MLO) may enable devices to simultaneously transmit and receive across different bands and channels by establishing two or more links to two or more AP radios. Wi-Fi 7 may seek to enhance these links by increasing throughput, which may be the measurement of data between devices in a local network. MLO may also lower latency (e.g., network server to client device time), and improve reliability.

In the initial version of MLO, the links were established to two radios of a single AP. However, the industry direction may be to establish links to multiple APs, either with a Multi-link Single Radio (MLSR) mode, where one link may be used for Transmit (Tx) and the other for Receive (Rx) or Multi-Link Multi-Radio (MLMR), where each link is used to Tx and Rx.

The choice to form an MLO may be on the client device side, but based on elements obtained from the AP (e.g., load or other performance parameters on the radio, short neighbor report with list of potential other radios, etc.) At any time, the client device may refresh its awareness of the AP environment and conditions to continue its MLO operations, switch to single radio mode, or move any MLO link to other radios.

Figure 1A:
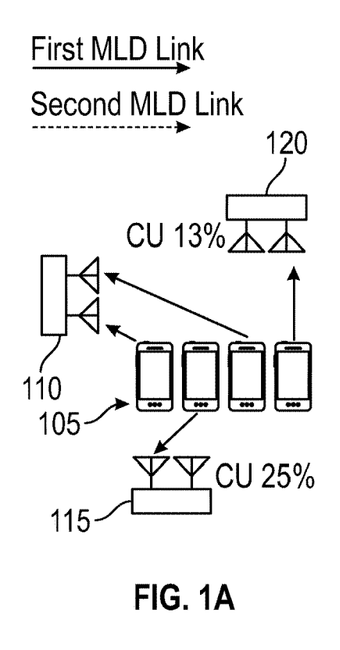
FIGS. 1A, 1B, 1C, and 1D illustrate pendular roaming.
Figure 1B:
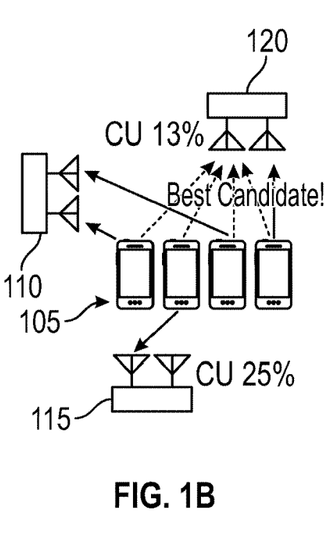
Figure 1C:
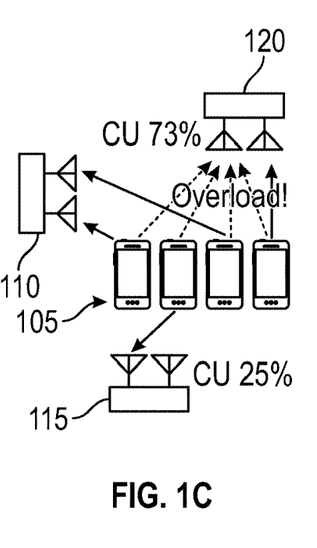
Figure 1D:
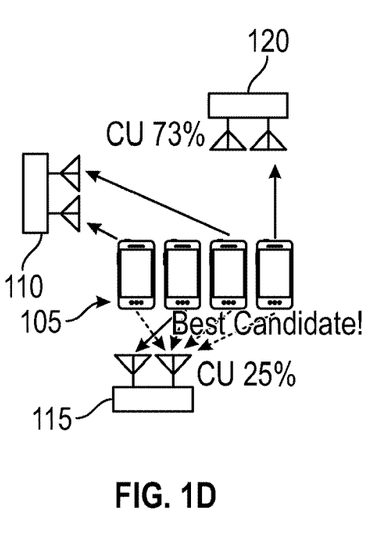

FIGS. 1A, 1B, 1C, and 1D illustrate pendular roaming of a set of client devices 105 between APs (e.g., first AP 110, second AP 115, and third AP 120). In large contiguous venues, this design may result in pendular inefficiencies. As shown in FIG. 1A, client devices may implement different roaming processes, but they may be based on overlapping sets of metrics (where, for example, the slope of the degradation in Tx/Rx efficiency is associated with a trigger to roam). In this scenario, set of client devices 105 may query for AP neighboring information, switch one of their links to the best available reported radio (e.g., third AP 120) as shown in FIG. 1B. This naturally may not happen at once, but over time. Yet, at some point, third AP 120 may become saturated, causing performance degradation on set of client devices 105, and causing all client devices with similar chipset logic to go query again at the same time as shown in FIG. 1C. An AP now announced as being the least loaded (e.g., second AP 115) receives a burst of associations within a short interval, while set of client devices 105 flee the overloaded third AP 120 as shown in FIG. 1D. Second AP 115 soon becomes overloaded. After a short interval, the process repeats in the other direction.

The same phenomenon may be expected in most high-density settings (e.g., classrooms etc.) The issue may be mitigated if each client had a different roaming algorithm and different thresholds (and thus if clients would attempt to find a better link at different times). Client devices may converge to the same types of metrics and thresholds values, where saturation of resources of an AP may cause a wave of client devices to simultaneously attempt to find better APs within a short interval. In the current single-link operation, the issue may be limited by the fact that roaming may comprise a disruptive process, and different chipsets may implement different delays and thresholds (after the initial "better link" discovery phase) before making a jump from one AP to another. However, in the "make-before-break" logic of MLO, where the client device may join another radio without needing to break its current connection, the wave of discoveries may be accompanied with waves of second link setups as described above. Accordingly, embodiments of the disclosure may provide a process that takes the MLO link establishment away from the local level to organize the link establishment at a larger floor level (e.g., a form of Radio Resource Management (RRM) for MLO).

Figure 2:
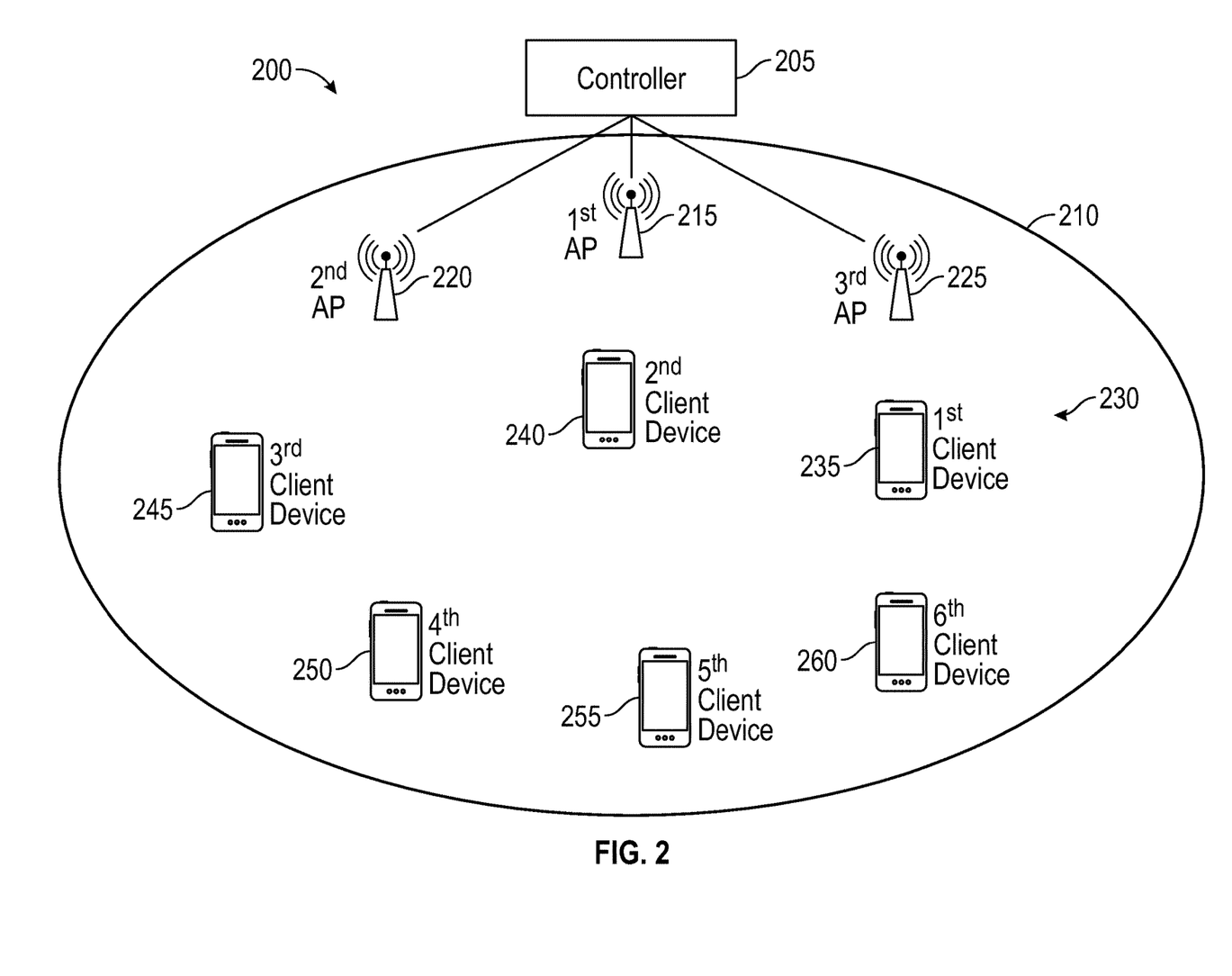
FIG. 2 is a block diagram of an operating environment for providing Multi-link Operation (MLO) usage balancing.

FIG. 2 shows an operating environment 200 for providing Multi-link Operation (MLO) usage balancing. As shown in FIG. 2, operating environment 200 may comprise a controller 205 and a coverage environment 210. Coverage environment 210 may comprise, but is not limited to, a Wireless Local Area Network (WLAN) comprising a plurality of Access Points (APs) that may provide wireless network access (e.g., access to the WLAN) for devices. The plurality of APs may comprise a first AP 215, a second AP 220, and a third AP 225. While FIG. 2 shows three APs, the plurality of APs may comprise any number of APs and is not limited to three. Each of the plurality of APs may be compatible with specification standards such as, but not limited to, the Institute of Electrical and Electronics Engineers (IEEE) 802.11 specification standard for example.

A plurality of client devices 230 may be deployed in coverage environment 210. The plurality of APs may provide wireless network access to plurality of client devices 230 as the plurality of client devices move within coverage environment 210. Coverage environment 210 may comprise an outdoor or indoor wireless environment for Wi-Fi or any type of wireless protocol or standard.

Plurality of client devices 230 may comprise a first client device 235, a second client device 240, a third client device 245, a fourth client device 250, a fifth client device 255, and a sixth client device 260. Ones of first plurality of devices 230 may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device.

Controller 205 may comprise a Wireless Local Area Network controller (WLC) and may provision and control coverage environment 210 (e.g., a WLAN). Controller 205 may allow plurality of client devices 230 to join coverage environment 210. In some embodiments of the disclosure, controller 205 may be implemented by a Digital Network Architecture Center (DNAC) controller (i.e., a Software-Defined Network (SDN) controller) that may configure information for coverage environment 210 in order to provide MLO usage balancing.

The elements described above of operating environment 200 (e.g., controller 205, first AP 215, second AP 220, third AP 225, first client device 235, second client device 240, third client device 245, fourth client device 250, fifth client device 255, and sixth client device 260) may be practiced in hardware and/or in software (including firmware, resident software, micro-code, etc.) or in any other circuits or systems. The elements of operating environment 200 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 200 may also be practiced using other technologies capable of performing logical operations such as, for example, AND, OR, and NOT, including but not limited to, mechanical, optical, fluidic, and quantum technologies. As described in greater detail below with respect to FIG. 6, the elements of operating environment 200 may be practiced in a computing device 600.

Figure 3:
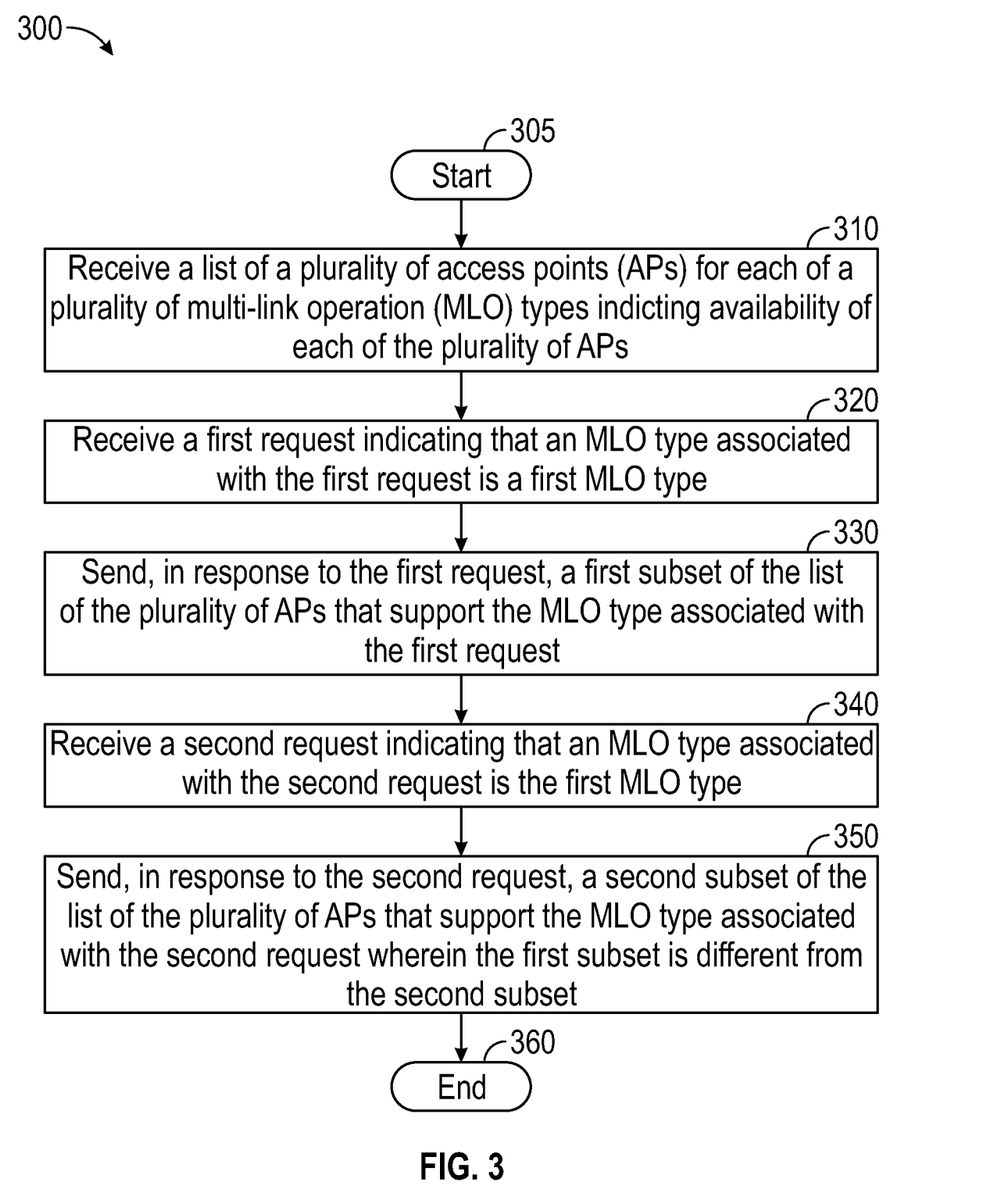
FIG. 3 is a flow chart of a method for providing MLO usage balancing.

FIG. 3 is a flow chart setting forth the general stages involved in a method 300 consistent with an embodiment of the disclosure for providing MLO usage balancing. Method 300 may be implemented using one of the plurality of APs as described in more detail above with respect to FIG. 2. Ways to implement the stages of method 300 will be described in greater detail below.

Method 300 may begin at starting block 305 and proceed to stage 310 where one of the plurality of APs (e.g., first AP 215) may receive a list of a plurality of APs for each of a plurality of Multi-link Operation (MLO) types indicating availability of each of the plurality of APs. For example, controller 205 may determine the available radio budget on each AP in the plurality of APs. The radio budget may be used to organize the allocation of resources for MLO client devices (e.g., plurality of client devices 230). The MLO client types may comprise Multi-link Single Radio (MLSR), Enhanced MLSR (eMLSR), Non-simultaneous TX and RX Multi-link Multi Radio (NSTR MLMR), and Simultaneous TX and RX (STR) MLMR. MLSR may have one radio and be able to RX and TX over one radio at a time. eMLSR may have one radio and may enhance MLSR with a reduced function radio to choose a best link. NSTR MLMR may have two or more radios and may be able to simultaneously RX and TX over the two or more radios, but under certain constraints (e.g., freq. separation, aligned TX/RX). STR MLMR may be able to simultaneously RX and TX over the two or more radios.

Controller 205 may evaluate capabilities of the MLO devices that broadly fall into, MLSR, eMLSR, NSTR MLMR and, STR MLMR. MLSR radios may be treated similarly to non-MLO devices. Based on the MLO device type, controller 205 may calculate potential active links supported by these various MLO device types.

Next, for each AP in the plurality of APs, controller 205 may determine the availability of radios on neighboring APs. Controller may send to the plurality of APs a sorted list (e.g., top n neighbor APs of a given AP with largest availability to smallest).

From stage 310, where one of the plurality of APs (e.g., first AP 215) receives the list of the plurality of APs for each of the plurality of MLO types indicating availability of each of the plurality of APs, method 300 may advance to stage 320 where one of the plurality of APs (e.g., first AP 215) may receive a first request indicating that an MLO type associated with the first request is a first MLO type. For example, first client device 235 may send a probe request (or any other management frame expecting a reduced or standard neighbor list) to first AP 215. This first request (e.g., probe request) my indicate that first client device 235 is an MLO device and which MLO type it may support.

Once one of the plurality of APs (e.g., first AP 215) receives the first request indicating that the MLO type associated with the first request is the first MLO type in stage 320, method 300 may continue to stage 330 where one of the plurality of APs (e.g., first AP 215) may send, in response to the first request, a first subset of the list of the plurality of APs that support the MLO type associated with the first request. For example, first AP 215 may return to first client device 235 a first subset of the neighbors that were selected by controller 205 and reported to first AP 215 (e.g., the first subset may comprise top neighbor 1, 3, and 5).

After the one of the plurality of APs (e.g., first AP 215) sends, in response to the first request, the first subset of the list of the plurality of APs that support the MLO type associated with the first request in stage 330, method 300 may proceed to stage 340 where the one of the plurality of APs (e.g., first AP 215) may receive a second request indicating that an MLO type associated with the second request is the first MLO type. For example, second client device 240 may send a probe request (or any other management frame expecting a reduced or standard neighbor list) to first AP 215. This second request (e.g., probe request) my indicate that second client device 240 is an MLO device and which MLO type it may support.

From stage 340, where the one of the plurality of APs (e.g., first AP 215) receives the second request indicating that an MLO type associated with the second request is the first MLO type, method 300 may advance to stage 350 where the one of the plurality of APs (e.g., first AP 215) may send, in response to the second request, a second subset of the list of the plurality of APs that support the MLO type associated with the second request. The first subset is different from the second subset. For example, first AP 215 may return to second client device 240 the second subset of the neighbors that were selected by controller 205 and reported to first AP 215. This second subset may be slightly different from the first subset (e.g., the second subset may comprise top neighbor 2, 6, and 7).

Controller 205 may run an optimization process intended to distribute the list of neighbors so as to limit the overload on a given AP. This distribution of neighbors list also considers MLO type. The distribution of neighbors list may be biased based on the number of active links from the MLO client devices. Because MLSR and eMLSR only supports Tx/Rx functions over a single radio, they may be less tolerant compared to NSTR MLMR and STR MLMR that may be more lenient towards some amount of Wi-Fi interference or higher channel utilization. Once the one of the plurality of APs (e.g., first AP 215) sends, in response to the second request, the second subset of the list of the plurality of APs that support the MLO type associated with the second request in stage 350, method 300 may then end at stage 360.

Figure 4:
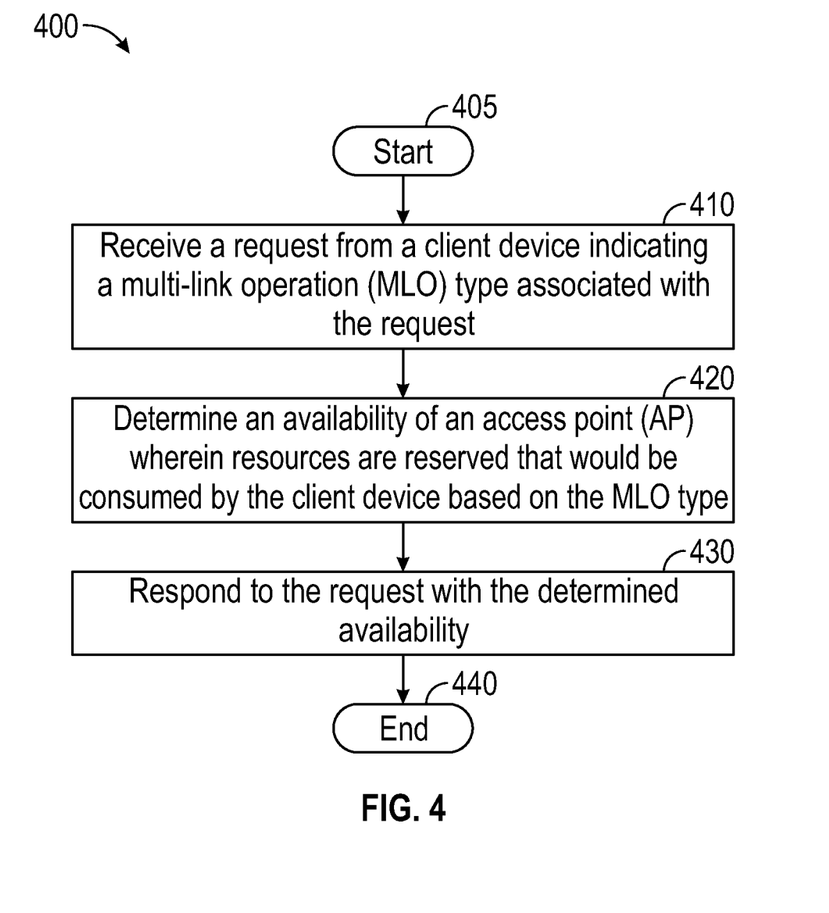
FIG. 4 is a flow chart of a method for providing MLO usage balancing.

FIG. 4 is a flow chart setting forth the general stages involved in a method 400 consistent with an embodiment of the disclosure for providing MLO usage balancing. Method 400 may be implemented using one of the plurality of APs as described in more detail above with respect to FIG. 2. Ways to implement the stages of method 400 will be described in greater detail below.

Method 400 may begin at starting block 405 and proceed to stage 410 where one of the plurality of APs (e.g., first AP 215) may receive a request from a client device (e.g., first client device 235) indicating an MLO type associated with the request. For example, first client device 235 may send a direct probe to first AP 215.

From stage 410, where the one of the plurality of APs (e.g., first AP 215) receives the request from the client device (e.g., first client device 235) indicating the Multi-link Operation (MLO) type associated with the request, method 400 may advance to stage 420 where the one of the plurality of APs (e.g., first AP 215) may determine an availability of an Access Point (AP) and may reserve resources that would be consumed by the client device based on the MLO type. For example, when responding to a direct probe, first AP 215 may modulate its availability parameters to modulate its availability based on the number of requesting client devices. In one embodiment, first AP 215 may consider a rolling percentage of its Channel Usage (CU) to be taken by each client device's number of active links. Each of these links may contribute to some amount of TxUtil (Downlink Utilization) and RxUtil (Uplink Utilization). First AP 215 may indicate in its response its availability (e.g., CU load 22%).

Then, first AP 215 may compute a probability that first client device 235 may associate and consume the reserved resources along with its number of supported active links, and temporarily accounts for this potential consumption by locking (i.e., reserving) a potentially consumed percentage of its remaining resources. For example, if an associated MLO client device is STR MLMR, then announcing CU load may be 22+5+5=32% (e.g., assuming 5% per link), however for eMLSR or MLSR, revised CU load may be 27% only for the next probing MLO client as a short term reservation. After a short interval, if the resources are not consumed (i.e., first client device 235 has not started the association process), first AP 215 may release the reserved resources back into its availability pool.

Once the one of the plurality of APs (e.g., first AP 215) determines the availability of the AP and reserves resources that would be consumed by the client device based on the MLO type in stage 420, method 400 may continue to stage 430 where the one of the plurality of APs (e.g., first AP 215) may respond to the request with the determined availability. For example, first AP 215 may indicate in its response its availability (e.g., CU load 22%). Once the one of the plurality of APs (e.g., first AP 215) responds to the request with the determined availability in stage 430, method 400 may then end at stage 440.

Figure 5:
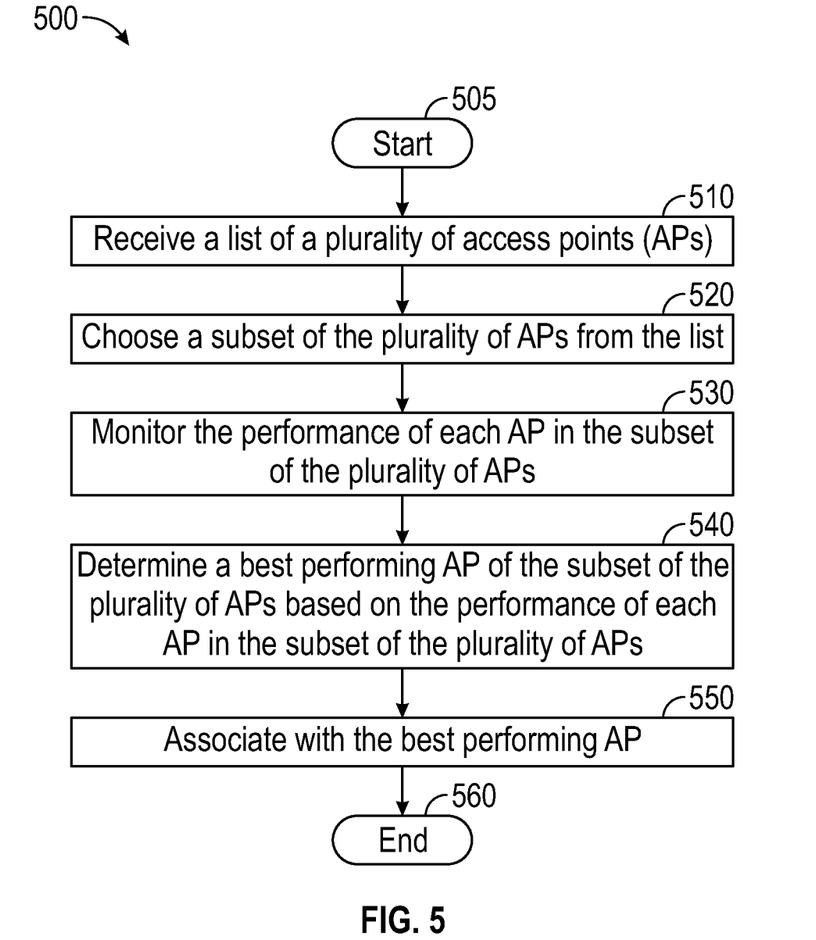
FIG. 5 is a flow chart of a method for providing MLO usage balancing.

FIG. 5 is a flow chart setting forth the general stages involved in a method 500 consistent with an embodiment of the disclosure for providing MLO usage balancing. Method 500 may be implemented using one of plurality of client devices 230 (e.g., first client device 235) as described in more detail above with respect to FIG. 2. Ways to implement the stages of method 500 will be described in greater detail below.

Method 500 may begin at starting block 505 and proceed to stage 510 where one of plurality of client devices 230 (e.g., first client device 235) may receive a list of a plurality of Access Points (APs). For example, controller 205 may compile the list of the plurality of APs and transmit it to first client device 235.

From stage 510, where first client device 235 receives the list of the plurality of APs, method 500 may advance to stage 520 where first client device 235 may choose a subset of the plurality of APs from the list. For example, embodiments of the disclosure my solve a load-balancing problem with multiple load-balancers (e.g., the N radios in a Multi-link Device (MLD)) that may take advantage of a randomized approaches if a local (e.g., client device) solution is sought.

Embodiments of the disclosure may exploit "the-power-of-two-choices" and have client devices choose N random or pseudo-random APs in the list that controller 205 provides. The choice may be skewed/polarized towards the least loaded APs, or it may be uniform, and it may use a hash algorithm (e.g., on any client identifier such as its Media Access Control (MAC) address). Furthermore, this load balancing process may also associate priority among these MLO client devices by ensuring MLSR and eMLSR stations may be given preferred links with cleaner channels. Load balancing may also consider MLO's historical Service Level Agreement (SLA)/throughput requirements bias selection of the appropriate radios.

Once first client device 235 chooses the subset of the plurality of APs from the list in stage 520, method 500 may continue to stage 530 where first client device 235 may monitor the performance of each AP in the subset of the plurality of APs. For example, first client device 235 may associates an MLD link to each of the selected APs in the subset and may monitor performances (e.g., the latency of the transmit queues and the time to grab the channel). To achieve this, first client device 235 may place a background load on all APs in the subset at a partially randomized period. To avoid network synchronization, first client device 235 may decide when to start its own beat on its own (e.g., pseudo randomly), or based on a trigger by controller 205 that may be voluntarily offset from the other client devices. The background load may be selected based on Quality-of-Service (QoS) values for example.

After first client device 235 monitors the performance of each AP in the subset of the plurality of APs in stage 530, method 500 may proceed to stage 540 where first client device 235 may determine a best performing AP of the subset of the plurality of APs based on the performance of each AP in the subset of the plurality of APs. For example, second AP 220 may have the best performance and first client device 235 may select second AP 220.

From stage 540, where first client device 235 determines the best performing AP of the subset of the plurality of APs based on the performance of each AP in the subset of the plurality of APs, method 500 may advance to stage 550 where first client device 235 may associate with the best performing AP. For example, with second AP 220 having the best performance results, first client device 235 may place its main load on second AP 220. If the least loaded among N random choices is used to measure the load from M number of clients with T active links, then $\log T_{MLO\_Links}/\log N_{AP+}O(1)$ may become the max load on all APs with high probability.

Consistent with embodiments of the disclosure, by randomizing the choice of N elements, biasing all clients to the least loaded AP may be avoided. Then, by choosing the least loaded ones among those N APs, the best decision among the reduced set that was randomly created may be made. It may be unlikely for all clients to choose the same N random APs, hence avoiding the problem. Furthermore, in order to avoid performance starvation of the single radio client devices, eMLSR and MLSR may be allowed first in this sequence. Controller 205 may still compute sub lists of all the neighbor APs in order to affect client devices to groups of APs. Once first client device 235 associates with the best performing AP in stage 550, method 500 may then end at stage 560.

Figure 6:
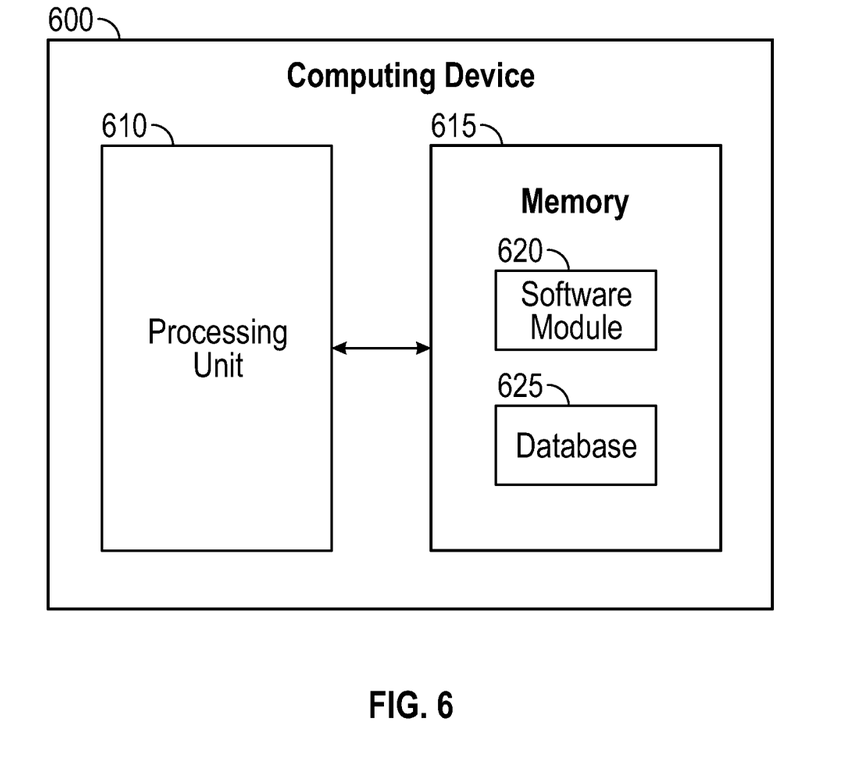
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for providing MLO usage balancing as described above with respect to FIG. 3, FIG. 4, and FIG. 5. Computing device 600, for example, may provide an operating environment for controller 205, first AP 215, second AP 220, third AP 225, first client device 235, second client device 240, third client device 245, fourth client device 250, fifth client device 255, and sixth client device 260. Controller 205, first AP 215, second AP 220, third AP 225, first client device 235, second client device 240, third client device 245, fourth client device 250, fifth client device 255, and sixth client device 260 may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a computing device, a list of a plurality of Access Points (APs) for each of a plurality of Multi-link Operation (MLO) types indicating availability of each of the plurality of APs;
    receiving a first request indicating that an MLO type associated with the first request is a first MLO type;
    sending, in response to the first request, a first subset of the list of the plurality of APs that support the MLO type associated with the first request;
    receiving a second request subsequent to receiving the first request, the second request indicating that an MLO type associated with the second request is the first MLO type; and
    sending, in response to the second request, a second subset of the list of the plurality of APs that support the MLO type associated with the second request, wherein the first subset is different from the second subset, and wherein each of the first subset and the second subset is determined based on a number of active links from MLO client devices with each of the plurality of APs when the first request and the second request were respectively received.

2. The method of claim 1, further comprising determining, by a controller, the availability of each of the plurality of Access Points (APs) for each of the plurality of Multi-link Operation (MLO) types.

3. The method of claim 1, further comprising creating the list of the plurality of APs for each of the plurality of MLO types indicating the availability of each of the plurality of APs.

4. The method of claim 1, wherein the first MLO type comprises Multi-link Single Radio (MLSR).

5. The method of claim 1, wherein the first MLO type comprises enhanced Multi-link Single Radio (eMLSR).

6. The method of claim 1, wherein the first MLO type comprises Non-simultaneous Transmit and Receive Multi-link Multi Radio (Non-STR MLMR).

7. The method of claim 1, wherein the first MLO type comprises Simultaneous Transmit and Receive Multi-link Multi Radio (STR MLMR).

8. A system comprising:
    a memory storage; and
    a processor coupled to the memory storage, wherein the processor is operative to:
        receive a list of a plurality of Access Points (APs) for each of a plurality of Multi-link Operation (MLO) types indicating availability of each of the plurality of APs;
        receive a first request indicating that an MLO type associated with the first request is a first MLO type;
        send, in response to the first request, a first subset of the list of the plurality of APs that support the MLO type associated with the first request;
        receive a second request subsequent to receiving the first request, the second request indicating that an MLO type associated with the second request is the first MLO type; and
        send, in response to the second request, a second subset of the list of the plurality of APs that support the MLO type associated with the second request, wherein the first subset is different from the second subset, and wherein each of the first subset and the second subset is determined based on a number of active links from MLO client devices with each of the plurality of APs when the first request and the second request were respectively received.

9. The system of claim 8, wherein the processor is further operative to:
    determine the availability of each of the plurality of Access Points (APs) for each of the plurality of Multi-link Operation (MLO) types.

10. The system of claim 8, wherein the processor is further operative to:
create the list of the plurality of APs for each of the plurality of MLO types indicating the availability of each of the plurality of APs.

11. The system of claim 8, wherein the first request is received from a first device and the second request is received from a second device.

12. The system of claim 8, wherein the first MLO type comprises Multi-link Single Radio (MLSR).

13. The system of claim 8, wherein the first MLO type comprises enhanced Multi-link Single Radio (eMLSR).

14. The system of claim 8, wherein the first MLO type comprises Non-simultaneous Transmit and Receive Multi-link Multi Radio (Non-STR MLMR) or Simultaneous Transmit and Receive Multi-link Multi Radio (STR MLMR).

15. A non-transitory computer-readable medium that stores a set of Instructions, which when executed, to perform a method comprising:
receiving, by a computing device, a list of a plurality of Access Points (APs) for each of a plurality of Multi-link Operation (MLO) types indicating availability of each of the plurality of APs;
receiving a first request indicating that an MLO type associated with the first request is a first MLO type;
sending, in response to the first request, a first subset of the list of the plurality of APs that support the MLO type associated with the first request;
receiving a second request subsequent to receiving the first request, the second request indicating that an MLO type associated with the second request is the first MLO type; and
sending, in response to the second request, a second subset of the list of the plurality of APs that support the MLO type associated with the second request, wherein the first subset is different from the second subset, and wherein each of the first subset and the second subset is determined based on a number of active links from MLO client devices with each of the plurality of APs when the first request and the second request were respectively received.

16. The non-transitory computer-readable medium of claim 15, further comprising determining, by a controller, the availability of each of the plurality of Access Points (APs) for each of the plurality of Multi-link Operation (MLO) types.

17. The non-transitory computer-readable medium of claim 15, further comprising creating the list of the plurality of APs for each of the plurality of MLO types indicating the availability of each of the plurality of APs.

18. The non-transitory computer-readable medium of claim 15, wherein the first MLO type comprises Multi-link Single Radio (MLSR).

19. The non-transitory computer-readable medium of claim 15, wherein the first MLO type comprises enhanced Multi-link Single Radio (eMLSR).

20. The non-transitory computer-readable medium of claim 15, wherein the first MLO type comprises Non-simultaneous Transmit and Receive Multi-link Multi Radio (Non-STR MLMR) or Simultaneous Transmit and Receive Multi-link Multi Radio (STR MLMR).

* * * * *